United States Patent [19]
Kujawski

[11] Patent Number: 5,310,029
[45] Date of Patent: May 10, 1994

[54] BRAKE TUBE COUPLING

[75] Inventor: Rick A. Kujawski, Mount Clemens, Mich.

[73] Assignee: Bundy Corporation, Warren, Mich.

[21] Appl. No.: 962,780

[22] Filed: Oct. 19, 1992

[51] Int. Cl.$^5$ ............................................. F16L 25/00
[52] U.S. Cl. ................................. 188/352; 285/150; 285/342; 303/1
[58] Field of Search .................... 188/352; 303/1; 285/342, 343, 353, 150

[56] References Cited

U.S. PATENT DOCUMENTS

| | | | |
|---|---|---|---|
| 1,508,026 | 9/1924 | Noble | 285/343 |
| 1,687,386 | 10/1928 | Reeve | 285/150 |
| 2,332,682 | 10/1943 | Yelinek | 285/342 |
| 2,450,581 | 10/1948 | Couty | 285/343 |
| 3,915,479 | 10/1975 | Sotolongo | 285/158 |
| 4,664,425 | 5/1987 | Bona | 285/342 |

Primary Examiner—Matthew C. Graham
Attorney, Agent, or Firm—Barnes, Kisselle, Raisch, Choate, Whittemore & Hulbert

[57] ABSTRACT

A corrosion resistant and low torque connector with a brake tube having a flange adjacent a flared end on which an O-ring is received and urged into a sealing engagement with a frusto-conical cavity of a female fitting by a complementarily threaded male fitting received over the tube and bearing on the flange.

18 Claims, 1 Drawing Sheet

BRAKE TUBE COUPLING

FIELD OF THE INVENTION

This invention relates to brake tubes and more particularly to brake tube couplings for releasably connecting brake tubes to components of a vehicle hydraulic brake system.

BACKGROUND OF THE INVENTION

Couplings with complementarily threaded male and female fittings are commonly used to connect brake tubes to components of a vehicle brake system. The threaded male fitting has a through passage receiving a brake tube which is flared at its end and traps the male fitting on the brake tube. The threaded female fitting has a through passage extending to a raised conic end section. As the male and female fittings are threaded together, the flared end of the brake tube is forced into sealing engagement with the conic section.

To obtain the high pressure seal required for a hydraulic brake system, both connectors must be constructed of metal, and 20-25 ft./lbs. of torque are required to threadingly engage the fittings to form an adequate face seal between the conic section of the female and the flared end of the brake tube. To achieve an adequate seal a high quality surface finish is also required on both the conic section of the female fitting and the corresponding complementary conical portion of the flared end of the brake tube.

The seal can be unreliable because of an inability to maintain close tolerances and a high quality surface finish on mass produced parts. In use, corrosion between the two metal fitting bodies and the metal brake tube complicates servicing and replacement of brake component parts and may cause seal failures.

SUMMARY OF THE INVENTION

A corrosion resistant and low torque connector with a brake tube having a flange adjacent a flared end portion on which an O-ring is received and urged into sealing engagement with a frusto-conical portion of a female fitting by a complementarily threaded male fitting received over the tube and bearing on the flange. Preferably the extent of compression of the O-ring is accurately controlled by engagement of the flange with the tapered conical cavity within the female fitting. Preferably, the cavity communicates with brake fluid to force the O-ring into sealing engagement when the brake fluid is pressurized by application of the brakes. A satisfactory seal can be achieved with only 2 or 3 pounds of torque applied to secure together the threaded fittings. Preferably, at least the male fitting is made of plastic which eliminates corrosion between the coupling components.

Objects, features and advantages of this invention are to provide a high pressure fluid coupling which provides a suitable seal with low connecting torque, eliminates corrosion, does not require a critical finish of sealing surfaces, is highly reliable, rugged, durable, of relatively simple design and economical manufacture and assembly, and has a long in service useful life.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
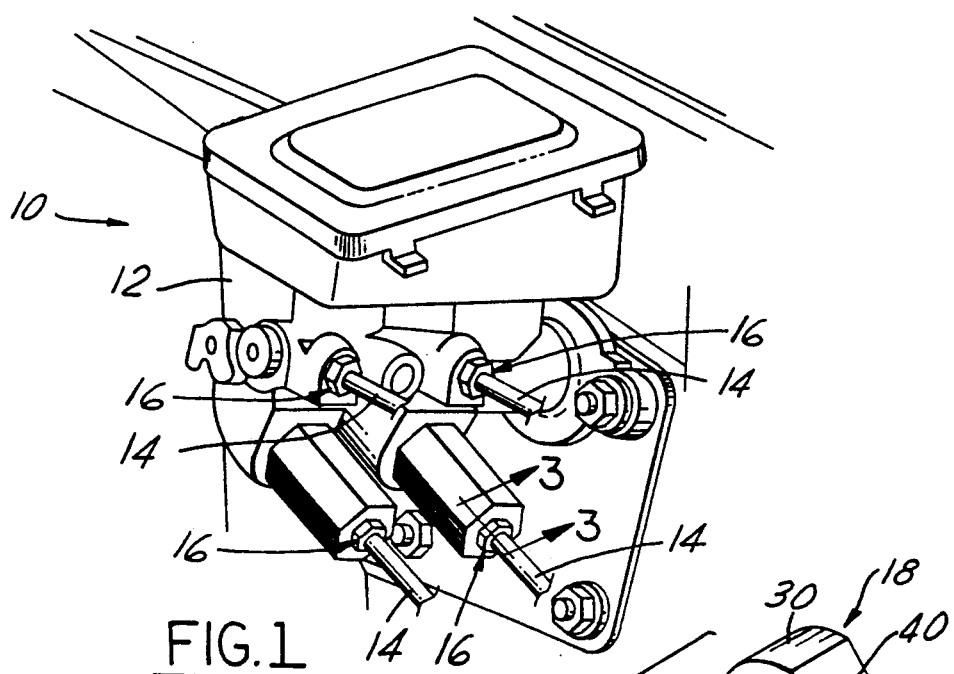
FIG. 1 is a perspective view of a hydraulic brake master cylinder and fluid reservoir and four brake tubes, each being connected with a coupling of this invention, the entire assembly being mounted to a sidewall beneath a hood of a vehicle.
Figure 2:
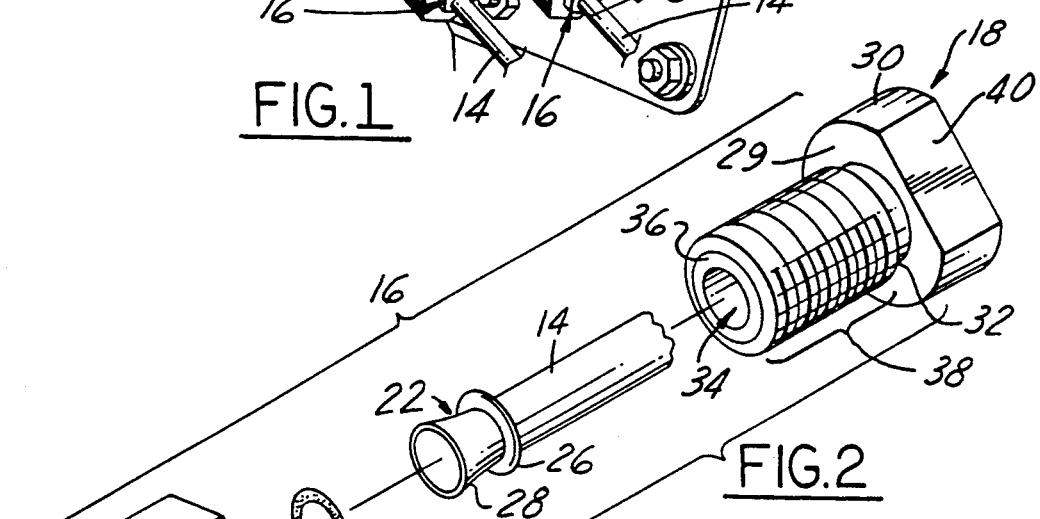
FIG. 2 is an exploded view of the coupling of this invention illustrating its male and female fittings, O-ring and brake tube end.
Figure 3:
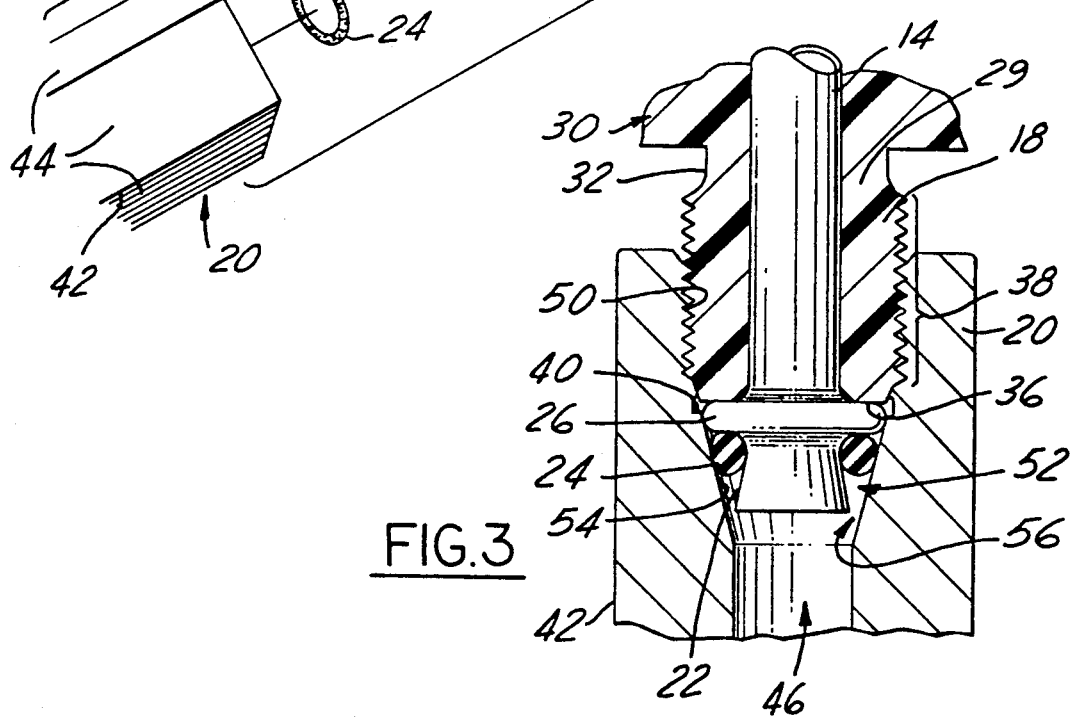
FIG. 3 is a sectional view taken generally on line 33 of FIG. 1 and illustrating the fittings and brake tube of the coupling in assembled and sealing relationship.

Referring in more detail to the drawings, FIG. 1 illustrates a hydraulic brake master cylinder and reservoir 10 with a housing 12 to which brake tubes 14 are connected by couplings 16 embodying this invention. As shown in FIGS. 2 and 3, each coupling has complementarily threaded male and female fittings 18 & 20 between which a flared end 22 of the tube with an O-ring 24 thereon are received. The tube has a circumferentially continuous flange 26 adjacent the base of an outwardly flared end or frusto-conical portion 28 over which, in assembly, the O-ring is received and bears on the flange. Preferably, the brake tube is made from steel and the flared end is formed by cold heading to form the flared portion and to upset the flange.

The male fitting has a body 29 with a head 30, a shank 32 and a central passage 34 through which the tube is slidably received. The shank has an end face 36 which, in assembly, bears on the flange 26 of the tube and threads 38 engageable with complementary threads in the female fitting. To facilitate installation and tightening, the head 30 is non-circular and preferably has a pair of spaced apart and parallel flats 40 engageable by a tool, such as a wrench.

The female fitting 20 has a body 42 with exterior flat faces 44, preferably in a hexagonal configuration, for engagement by a tool, such as a wrench, to facilitate assembly and tightening of the coupling. The body has a central through passage 46 with a counterbore 48 at one end having complementary threads 50 for mating engagement with the threaded shank 32 of the male fitting. In assembly, the O-ring 24 and flared end 22 of the tube are received in a frusto-conical cavity 52 disposed in the passage 46 adjacent the counterbore. The sidewall 54 of the frusto-conical cavity sealingly engages the O-ring and tapers inwardly in a direction generally opposed to or reversed from the taper of the conical flared portion 28 of the tube.

The flange 26, flared portion 28 of the tube, and conical reverse tapered cavity 52 of the fitting are constructed, arranged and dimensioned so that in assembly the O-ring is generally radially compressed or distorted from its unstressed state into firm engagement with both the tube and the female fitting to provide a seal between them. To further control the extent to which the O-ring is generally radially compressed, the flange 26 and conical cavity 52 are dimensioned to provide a positive stop so that in assembly the flange seats on the sidewall 54 of the conical cavity before the threaded shank 32 of the male fastener bottoms out in the counterbore 48 of the female fitting. When assembled, the O-ring is desirably compressed about 10% to 30%, and preferably about 12% to 15%, of its nominal cross sectional diameter in its unstressed state. Preferably, in assembly, the flared portion 28 of the brake tube is spaced from the conical cavity of the female fitting to provide a circumferential space 56 so that the brake fluid acts on the exposed surface of the O-ring when the brakes are applied to force the O-ring into firm sealing engagement with both the brake tube and the female fitting.

Preferably, to eliminate corrosion between components of the coupling, the male fitting is made of a rigid plastic material, such as Nylon 46. If desired, the female fitting or both the male and female fittings, can be made of a rigid plastic material. Fittings of a plastic material provide sufficient connecting or fastening strength because of the relatively small force required to compress the O-ring, seat the tube flange, and resist the generally axial load applied to the coupling by the brake fluid acting on the O-ring and tube flange. With preferably course threads of the fittings, the coupling can provide a fluid tight seal with a pressure exceeding the bursting strength of about 20,000 psi of conventional steel brake tubes or lines.

In assembling the coupling 16, the male fitting 18 is telescoped over the tube 14 so that its end face 36 is adjacent the tube flange 26 and the O-ring 24 is received by the flared portion 28 adjacent the flange. The tube end 22 and shank 32 are inserted into the open end of the female fitting 20 and the fittings are relatively turned or rotated to thread the shank of the male fitting into the threaded counterbore 48 of the female fitting. The fittings are threaded together sufficiently to urge the end face 36 of the male fitting to bear on the tube flange 26 and urge it into engagement with the sidewall 54 of the conical cavity 52 of the female fitting. Typically, a torque of only 2 or 3 foot pounds is applied to the fittings to seat the flange of the tube in the conical cavity. When assembled, the O-ring 24 is generally radially compressed and urged into sealing engagement with both the tube and the female fitting to provide a seal therebetween. When the brake fluid is pressurized by application of the brakes, it also urges the O-ring into firm sealing engagement. This construction and arrangement provides a fluid tight seal which does not leak of 12,000 to 15,000 psi. Currently, automobile hydraulic brake systems produce a maximum pressure of the brake fluid of less than 2500 psi. Therefore, this construction provides a highly satisfactory coupling and seal for hydraulic brake systems for vehicle applications.

I claim:

1. A coupling for releasably and sealingly connecting a brake tube with a flange adjacent an outwardly flared and circumferentially continuous end portion, comprising, a first fitting having an end face and a passage therethrough constructed and arranged to telescopically receive a brake tube with the flange adjacent said end face, a second fitting having a passage therethrough with a conical cavity therein having a circumferentially continuous sidewall with a taper reversed relative to the taper of the flared end of the tube and inclined to the axis of said flared end portion of the tube, an annular seal of a flexible resilient material which is circumferentially continuous and constructed and arranged to be received in assembly over the flared end of the brake tube and bearing on said conical sidewall of said second fitting, male threads on one of said fittings, female threads in the other of the said fittings and complementary to said male threads for mating threaded engagement therewith, said threads of said second fitting having a diameter larger than the outside diameter of said annular seal and said flange, and said fittings are constructed and arranged so that in assembly with the male and female threads interengaged, said first fitting disposes the flared end of the tube in said conical cavity of the second fitting with said end face bearing on the flange of the tube and said annular seal is received over the flared end of the tube and bearing on all three of said flange, said tube and said sidewall of said conical cavity of said second fitting to provide a fluid tight seal between said second fitting and the tube at a fluid pressure of at least 12,000 psi with said fittings threaded together with a torque of not more than three foot pounds.

2. The coupling of claim 1 wherein one of said fittings is made of a plastic material.

3. The coupling of claim 1 wherein one of said fittings is made of a plastic material and other of said fittings is made of a metal.

4. The coupling of claim 1 wherein both of said fittings are made of a plastic material.

5. The coupling of claim 1 wherein one of said fittings is made of Nylon.

6. The coupling of claim 1 wherein one of said fittings also comprises a head having a non-circular periphery with at least one pair of spaced apart and generally parallel faces engageable by a tool for rotating said one fitting.

7. The coupling of claim 1 wherein said annular seal is an O-ring.

8. The coupling of claim 1 wherein said conical cavity of said second fitting is constructed, arranged and dimensioned relative to the flared end of the tube so that in assembly there is a space between them through which fluid in the cavity acts on the annular seal to urge it into engagement with both the tube and said sidewall of said conical section of said second fitting.

9. The coupling of claim 1 wherein in assembly the flange of the tube bears on said sidewall of said conical section of said second fitting.

10. The coupling of claim 1 wherein in assembly the flange of the tube bears on the second fitting.

11. A coupling comprising, a tube with a flange and an outwardly flared and circumferentially continuous end portion adjacent said flange, a first fitting having an end face and a passage therethrough constructed and arranged to telescopically receive said brake tube with said flange adjacent said end face, a second fitting having a passage therethrough with a conical cavity therein having a circumferentially continuous sidewall with a taper reversed relative to the taper of said flared end of said tube and inclined to the axis of said flared end portion of said tube, an annular seal of a flexible resilient material which is circumferentially continuous and constructed and arranged to be received in assembly over said flared end of said tube and bearing on said sidewall of said conical cavity of said second fitting, male threads on one of said fittings, female threads in the other said fittings and complementary to said male threads for mating threaded engagement therewith, said threads of said second fitting having a diameter larger than the outside diameter of said annular seal and said flange, and said fittings are constructed and arranged so that in assembly with the male and female threads interengaged, said first fitting disposes said flared end of said tube in said conical cavity of said second fitting with said end face bearing on said flange of said tube and said annular seal is received over said flared end of said tube and bearing on all three of said flange, said tube and said sidewall of said conical cavity of said second fitting to provide a fluid tight seal between said second fitting and said tube at a fluid pressure of at least 12,000 psi with said fittings threaded together with a torque of not more than three foot pounds.

12. The coupling of claim 11 wherein one of said fittings is made of a plastic material.

13. The coupling of claim 11 wherein one of said fittings also comprises a head having a non-circular periphery with at least one pair of spaced apart and generally parallel faces engageable by a tool for rotating said one fitting.

14. The coupling of claim 11 wherein said annular seal is an O-ring.

15. The coupling of claim 11 wherein said conical cavity of said second fitting is constructed, arranged and dimensioned relative to the flared end of the tube so that in assembly there is a space between them through which fluid in the cavity acts on the annular seal to urge it into engagement with both the tube and said sidewall of said conical section of said second fitting.

16. The coupling of claim 11 wherein in assembly the flange of the tube bears on the second fitting.

17. The coupling of claim 11 wherein in assembly the flange of the tube bears on said sidewall of said conical section of said second fitting.

18. A coupling comprising, a tube with a flange and an outwardly flared and circumferentially continuous end portion adjacent said flange, a first fitting having an end face and a passage therethrough constructed and arranged to telescopically receive said brake tube with said flange adjacent said end face, a second fitting having a passage therethrough with a conical cavity therein having a circumferentially continuous sidewall with a taper reversed relative to the taper of said flared end of said tube and inclined to the axis of said flared end of said tube, an annular seal of a flexible resilient material which is circumferentially continuous and constructed and arranged to be received in assembly over said flared end of said tube and bearing on said sidewall of said conical cavity of said second fitting, male threads on one of said fittings, female threads in the other said fittings and complementary to said male threads for mating threaded engagement therewith, said threads of said second fitting having a diameter larger than the outside diameter of said annular seal and said flange, and said fittings are constructed and arranged so that in assembly with the male and female threads interengaged, said first fitting disposes said flared end of said tube in said conical cavity of said second fitting with said end face bearing on said flange of said tube and said annular seal is received over said flared end of said tube and bearing on all three of said flange, said tube and said sidewall of said conical cavity of said second fitting to provide a fluid tight seal between said second fitting and said tube at a fluid pressure of at least 12,000 psi with said fittings threaded together with a torque of not more than three foot pounds and said conical cavity of said second fitting is constructed, arranged and dimensioned relative to the flared end of the tube so that in assembly there is a space between them through which fluid in the cavity acts on the annular seal to urge it into engagement with both the tube and said sidewall of said conical section of said second fitting.

* * * * *